(12) United States Patent
Tang

(10) Patent No.: US 11,974,208 B2
(45) Date of Patent: Apr. 30, 2024

(54) RELAY ROUTING METHOD AND COMMUNICATION NODE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 125 days.

(21) Appl. No.: 16/924,798

(22) Filed: Jul. 9, 2020

(65) Prior Publication Data

US 2020/0344664 A1    Oct. 29, 2020

Related U.S. Application Data

(63) Continuation of application No. PCT/CN2018/086373, filed on May 10, 2018.

(30) Foreign Application Priority Data

Jan. 9, 2018 (WO) ............... PCT/CN2018/071974

(51) Int. Cl.
*H04W 40/12* (2009.01)
*H04L 12/46* (2006.01)
(Continued)

(52) U.S. Cl.
CPC ......... *H04W 40/12* (2013.01); *H04L 12/4604* (2013.01); *H04L 69/22* (2013.01);
(Continued)

(58) Field of Classification Search
CPC ..... H04W 40/12; H04W 40/24; H04W 84/18; H04W 40/22; H04W 40/248;
(Continued)

(56) References Cited

U.S. PATENT DOCUMENTS 9,160,566 B2    10/2015 Ulupinar et al.
2007/0097945 A1    5/2007 Wang et al.
(Continued)

FOREIGN PATENT DOCUMENTS

CN    101527710    9/2009
CN    101668324    3/2010
(Continued)

OTHER PUBLICATIONS

AT&T et al., "New SID Proposal: Study on Integrated Access and Backhaul for NR," 8881123GPP TSG RAN Meeting #75, RP-170831 (revision of RP-170821), Mar. 2017, 5 pages.
(Continued)

*Primary Examiner* — Jae Y Lee
(74) *Attorney, Agent, or Firm* — Hodgson Russ LLP

(57) ABSTRACT

Disclosed in an embodiment of the present application are a relay routing method and a communication node, the routing method comprising: a current relay node receiving a data packet, a message header of the data packet comprising an address of a destination node of the data packet; and the current relay node determining, according to the address of the destination node, whether to forward the data packet. The routing method and communication node of the embodiment of the present application are beneficial in improving the performance of a relay network.

13 Claims, 4 Drawing Sheets

(51) Int. Cl.
*H04L 69/22* (2022.01)
*H04L 69/322* (2022.01)
*H04W 40/24* (2009.01)
*H04W 84/18* (2009.01)

(52) U.S. Cl.
CPC .......... *H04L 69/322* (2013.01); *H04W 40/24* (2013.01); *H04W 84/18* (2013.01)

(58) Field of Classification Search
CPC ... H04L 12/4604; H04L 69/22; H04L 69/322; H04L 45/22; H04L 29/12; H04L 45/745; H04L 45/54
See application file for complete search history.

(56) References Cited

U.S. PATENT DOCUMENTS

| | | |
|---|---|---|
| 2009/0080394 A1 | 3/2009 | Ishii |
| 2009/0141668 A1 | 6/2009 | Zhang et al. |
| 2009/0190521 A1 | 7/2009 | Horn et al. |
| 2009/0190522 A1 | 7/2009 | Horn et al. |
| 2010/0103864 A1 | 4/2010 | Ulupinar et al. |
| 2012/0051364 A1 | 3/2012 | Fujita et al. |
| 2013/0136019 A1 | 5/2013 | Fujimoto |
| 2015/0365876 A1 | 12/2015 | Wang et al. |
| 2016/0197660 A1* | 7/2016 | O'Keeffe ............... H04B 17/14 370/329 |
| 2017/0063681 A1 | 3/2017 | Kaplan et al. |
| 2018/0139680 A1* | 5/2018 | Hui ....................... H04W 40/16 |
| 2018/0167956 A1* | 6/2018 | Cao ....................... H04W 76/10 |
| 2018/0337846 A1* | 11/2018 | Lee ..................... H04W 28/082 |
| 2020/0112879 A1* | 4/2020 | Shimoda .................. H04L 1/08 |
| 2020/0119864 A1* | 4/2020 | Xu ........................ H04W 76/15 |

FOREIGN PATENT DOCUMENTS

| | | |
|---|---|---|
| CN | 101933366 | 12/2010 |
| CN | 101933367 | 12/2010 |
| CN | 104717714 | 6/2015 |
| CN | 107249204 | 10/2017 |
| JP | 2000069046 | 3/2000 |
| JP | 2009060583 | 3/2009 |
| JP | 2009077119 | 4/2009 |
| JP | 2011511574 | 4/2011 |
| JP | 2013115471 | 6/2013 |
| JP | 2015002504 | 1/2015 |
| JP | 2015070614 | 4/2015 |
| JP | 2015073193 | 4/2015 |
| WO | 2009097458 | 8/2009 |

OTHER PUBLICATIONS

EPO, Extended European Search Report for EP Application No. 18900033.4, dated Jan. 12, 2021.
WIPO, ISR for PCT/CN2018/071974, dated Sep. 11, 2018.
WIPO, ISR for PCT/CN2018/086373, dated Sep. 26, 2018.
CNIPA, First Office Action for CN Application No. 202010788451. 1, dated Sep. 2, 2021.
IPI, Office Action for IN Application No. 202027033386, dated Aug. 24, 2021.
JPO, Office Action for JP Application No. 2020-537750, dated Feb. 25, 2022.
EPO, Extended European Search Report for EP Application No. 22167355.1, dated Dec. 8, 2022.

* cited by examiner

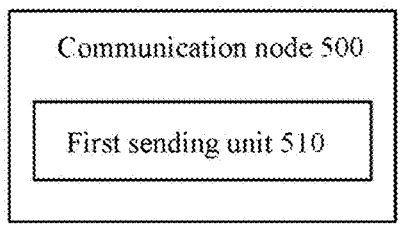

Fig.5

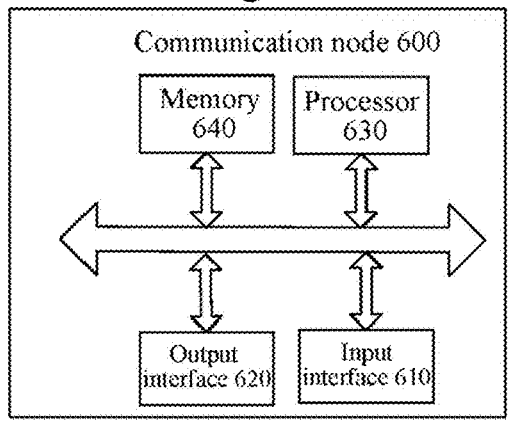

Fig.6

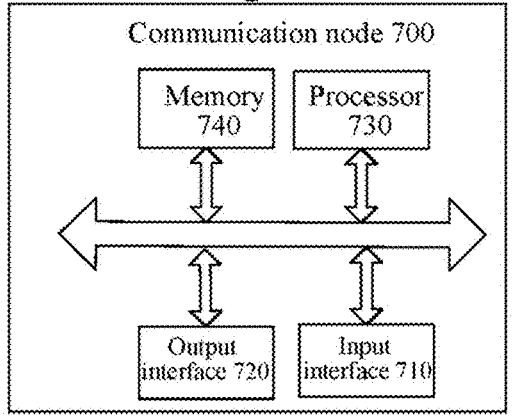

Fig.7

800 — The network anchor node receives a data packet, where a header of the data packet includes first information, and the first information is used to indicate a source address of the data packet ~810

The network anchor node determines the source address of the data packet according to the first information ~820

Fig.8

900 — The current relay node receives an uplink data packet ~910

The current relay node forwards the uplink data packet to a higher-level relay node serving the current relay node ~920

Fig.9

RELAY ROUTING METHOD AND COMMUNICATION NODE

CROSS-REFERENCE TO RELATED APPLICATION

This application is a continuation of International Application No. PCT/CN2018/086373, filed May 10, 2018, which claims priority to International Application No. PCT/CN2018/071974, filed Jan. 9, 2018, the entire disclosures of which are incorporated herein by reference.

TECHNICAL FIELD

The embodiments of the present application relate to the communication field, and more specifically, to a relay routing method and a communication node.

BACKGROUND

With the development of communication services and the growth of people's needs, future wireless communication systems need to support high rates and large capacities. Therefore, wireless relay has been introduced in New Radio (NR). The so-called wireless relay refers to a technology for relay transmission between a network and a terminal through one or more relay nodes. In the relay network, how to establish the routing topology is a problem that needs to be solved.

SUMMARY

In view of this, the embodiments of the present application provide a relay routing method and a communication node, which are beneficial to improve the performance of the relay network.

In a first aspect, a relay routing method is provided. The routing method includes: receiving, by a current relay node, a data packet, wherein a header of the data packet includes an address of a destination node of the data packet; and determining, by the current relay node, whether to forward the data packet according to the address of the destination node.

In a possible implementation manner, the routing method further includes: when determining, by the current relay node, to forward the data packet, determining, by the current relay node, to forward the data packet to at least one relay node.

In a possible implementation manner, before receiving, by the current relay node, the data packet, the routing method further includes: receiving, by the current relay node, a routing table sent by a central node, wherein the routing table is used to indicate a transmission path of the data packet from a source node to the destination node; and the determining, by the current relay node, to forward the data packet to at least one relay node includes: determining, by the current relay node, to forward the data packet to the at least one relay node according to the routing table.

In a possible implementation manner, the determining, by the current relay node, to forward the data packet to the at least one relay node includes: determining, by the current relay node, to forward the data packet to the at least one relay node according to a channel quality.

In a possible implementation manner, the receiving, by the current relay node, the data packet includes: receiving, by the current relay node, a first data packet and a second data packet, wherein the address of the destination node of the first data packet is the same as the address of the destination node of the second data packet; and the determining, by the current relay node, to forward the data packet to at least one relay node includes: determining, by the current relay node, to forward the first data packet to a first relay node of the at least one relay node; and determining, by the current relay node, to forward the second data packet to a second relay node of the at least one relay node.

In a possible implementation manner, the receiving, by the current relay node, the data packet includes: receiving, by the current relay node, a first data packet; and the routing method further includes: copying, by the current relay node, the first data packet.

In a possible implementation manner, the determining, by the current relay node, to forward the data packet to at least one relay node includes: determining, by the current relay node, to forward a first data packet to a first relay node of the at least one relay node, and determining to forward the copied first data packet to a second relay node of the at least one relay node.

In a possible implementation manner, the determining, by the current relay node, to forward the data packet to at least one relay node includes: determining, by the current relay node, to forward a first data packet to a first relay node of the at least one relay node using a first logical channel, and determining to forward the copied first data packet to the first relay node using a second logical channel.

In a possible implementation manner, the receiving, by the current relay node, the data packet includes: receiving, by the current relay node, a first data packet using a first logical channel; and the determining, by the current relay node, to forward the data packet to at least one relay node includes: forwarding, by the current relay node, the first data packet to the at least one relay node using the first logical channel.

In a possible implementation manner, the receiving, by the current relay node, the data packet includes: receiving, by the current relay node, a first data packet using a first logical channel; and the determining, by the current relay node, to forward the data packet to at least one relay node includes: forwarding, by the current relay node, the first data packet to the at least one relay node using a second logical channel according to configuration information.

Alternatively, the configuration information is determined by a central node.

Alternatively, the configuration information may be a routing table allocated by the central node.

In a possible implementation manner, the receiving, by the current relay node, the data packet includes: receiving, by the current relay node, the first data packet using the first logical channel; and the determining, by the current relay node, to forward the data packet to at least one relay node includes: forwarding, by the current relay node, the first data packet to the at least one relay node using a second logical channel according to an instruction of a relay layer.

In a possible implementation manner, the receiving, by the current relay node, the data packet includes: receiving, by the current relay node, a first data packet and a second data packet, wherein the address of the destination node of the first data packet is the same as the address of the destination node of the second data packet; and the determining, by the current relay node, to forward the data packet to at least one relay node includes: determining, by the current relay node, to forward the first data packet to a first relay node of the at least one relay node; and determining, by the current relay node, to forward the second data packet to the first relay node.

In a possible implementation manner, the receiving, by the current relay node, the data packet includes: receiving, by the current relay node, a first data packet and a second data packet, wherein the address of the destination node of the first data packet is the same as the address of the destination node of the second data packet; and the routing method further includes: detecting, by the current relay node, whether the first data packet and the second data packet are repetitive data packets according to a packet data aggregation protocol (PDCP) layer sequence number of the data packet.

In a possible implementation manner, the determining, by the current relay node, to forward the data packet to at least one relay node includes: when the first data packet and the second data packet are repetitive data packets, determining, by the current relay node, to send the first data packet or the second data packet to the at least one relay node; or when the first data packet and the second data packet are non-repetitive data packets, determining, by the current relay node, to send the first data packet and the second data packet to the at least one relay node.

In a possible implementation manner, the header of the data packet further includes an address of a source node of the data packet.

In a possible implementation manner, the routing method further includes: when the current relay node fails, reporting, by the current relay node, failure information to a central node, so that the central node updates a routing table, wherein the routing table is used to indicate a transmission path of the data packet from a source node to the destination node.

In a possible implementation manner, the data packet includes a downlink data packet.

In a possible implementation manner, the data packet includes an uplink data packet and a downlink data packet.

In a possible implementation manner, when the data packet is an uplink data packet, the at least one relay node is a parent node of the current relay node.

In a possible implementation manner, the address of the destination node is an address of a terminal device to which the data packet belongs.

In a possible implementation manner, the address of the destination node is an address of a relay node directly connected to a terminal device to which the data packet belongs.

In a possible implementation manner, the address of the destination node includes an address of a terminal device to which the data packet belongs and an address of a relay node directly connected to a terminal device to which the data packet belongs.

In a possible implementation manner, the address of the terminal device to which the data packet belongs is allocated by a central node.

In a possible implementation manner, the address of the relay node directly connected to the terminal device to which the data packet belongs is allocated by a central node.

In a possible implementation manner, the central node is an anchor node, a fixedly accessed access network node or a core network node.

In a possible implementation manner, the header of the data packet is in a header of a packet data aggregation protocol (PDCP) protocol data unit (PDU).

In a possible implementation manner, the header of the data packet is outside a header of the packet data aggregation protocol (PDCP) protocol data unit (PDU).

In a second aspect, a relay routing method is provided. The relay routing method includes: sending, by a central node, a routing table to a first relay node, wherein the routing table is used to indicate a transmission path of a data packet between a source node and a destination node.

In a possible implementation manner, the routing method further includes: when the first relay node fails, receiving, by the central node, failure information reported by the first relay node; and updating, by the central node, the routing table according to the failure information.

In a third aspect, a communication node is provided for performing the method in the first aspect or any possible implementation manner of the first aspect. Specifically, the communication node includes a unit for performing the method in the above first aspect or any possible implementation manner of the first aspect.

In a fourth aspect, a communication node is provided for performing the method in the second aspect or any possible implementation manner of the second aspect. Specifically, the communication node includes a unit for performing the method in the second aspect or any possible implementation manner of the second aspect.

In a fifth aspect, a communication node is provided. The communication node includes: a memory, a processor, an input interface, and an output interface. The memory, the processor, the input interface and the output interface are connected through a bus system. The memory is configured to store instructions, and the processor is configured to execute the instructions stored in the memory, to perform the method in the first aspect or any possible implementation manner of the first aspect.

In a sixth aspect, a communication node is provided. The communication node includes: a memory, a processor, an input interface, and an output interface. The memory, the processor, the input interface and the output interface are connected through a bus system. The memory is configured to store instructions, and the processor is configured to execute the instructions stored in the memory, to perform the method in the second aspect or any possible implementation manner of the second aspect.

In a seventh aspect, a data processing method for a relay network is provided, the method including: receiving, by a network anchor node, a data packet, wherein a header of the data packet includes first information, and the first information is used to indicate a source address of the data packet; and determining, by the network anchor node, the source address of the data packet according to the first information.

In a possible implementation manner, the data packet is an uplink data packet.

In a possible implementation manner, the first information is used to indicate at least one of following information: a type of a node sending the uplink data packet, the type including a terminal device or a relay node; an address of a terminal device sending the uplink data packet; and an address of a relay node sending the uplink data packet.

In a possible implementation manner, the method further includes: processing, by the network anchor node, the data packet according to the source address of the data packet.

Alternatively, the network anchor node may receive a data packet, which may be an uplink data packet, a downlink data packet, or a plurality of data packets, including an uplink data packet and a downlink data packet. If the data packet is the uplink data packet, the data packet may be directly sent by the terminal device to the network anchor node, then the source address of the data packet is considered to be the address of the terminal device, and the data packet may also be sent by the relay node to the network anchor node, then the source address of the data packet may be considered as the address of the relay node. If the data packet is the downlink data packet, the data packet may be sent by the core network device, then the source address of the data packet may be the address of the core network.

After acquiring the source address of the data packet, the network anchor node may further process the data packet. If the network anchor node receives a plurality of uplink data packets and obtains the source addresses of the plurality of data packets, the network anchor node may determine whether the source addresses of the plurality of data packets are the same address, and if so, the plurality of data packet may be sent to an upper layer corresponding to the source address for processing, and if not, the plurality of data packet may be separately sent to the upper layers corresponding to different source addresses for processing.

In an eighth aspect, a relay routing method is provided, the method including: receiving, by a current relay node, an uplink data packet; and forwarding, by the current relay node, the uplink data packet to an upper-level relay node serving the current relay node.

In a possible implementation manner, the receiving, by the current relay node, the uplink data packet includes: receiving, by the current relay node, a first uplink data packet; and the routing method further includes: copying, by the current relay node, the first uplink data packet.

In a possible implementation manner, the upper-level relay node includes a first relay node and a second relay node, and the forwarding, by the current relay node, the uplink data packet to the upper-level relay node serving the current relay node, includes: forwarding, by the current relay node, the first uplink data packet to the first relay node, and forwarding the copied first uplink data packet to the second relay node.

In a possible implementation manner, the upper-level relay node includes a first relay node, and the forwarding, by the current relay node, the uplink data packet to the upper-level relay node serving the current relay node, includes: forwarding, by the current relay node, the first uplink data packet to the first relay node using a first logical channel, and forwarding the copied first uplink data packet to the first relay node using a second logical channel.

In a possible implementation manner, the receiving, by the current relay node, the uplink data packet includes: receiving, by the current relay node, the first uplink data packet using a first logical channel; and the forwarding, by the current relay node, the uplink data packet to the upper-level relay node serving the current relay node, includes: forwarding, by the current relay node, the first uplink data packet to the upper-level relay node using the first logical channel.

In a possible implementation manner, the receiving, by the current relay node, the uplink data packet includes: receiving, by the current relay node, the first uplink data packet using a first logical channel; and the forwarding, by the current relay node, the uplink data packet to the upper-level relay node serving the current relay node, includes: forwarding, by the current relay node, the first uplink data packet to the upper-level relay node using a second logical channel according to configuration information.

In a possible implementation manner, the configuration information is determined by a network anchor node.

In a possible implementation manner, the receiving, by the current relay node, the uplink data packet includes: receiving, by the current relay node, a first uplink data packet using a first logical channel; and the forwarding, by the current relay node, the uplink data packet to the upper-level relay node serving the current relay node, includes: forwarding, by the current relay node, the first uplink data packet to the upper-level relay node using a second logical channel according to an instruction of a relay layer.

In a possible implementation manner, the upper-level relay node includes a first relay node and a second relay node, and the receiving, by the current relay node, the uplink data packet includes: receiving, by the current relay node, a first uplink data packet and a second uplink data packet, wherein a source address of the first uplink data packet is the same as an address of a source node of the second uplink data packet; and the forwarding, by the current relay node, the uplink data packet to the upper-level relay node serving the current relay node, includes: forwarding, by the current relay node, the first uplink data packet to the first relay node; and forwarding, by the current relay node, the second uplink data packet to the first relay node.

In a possible implementation manner, the receiving, by current relay node, the uplink data packet includes: receiving, by the current relay node, a first uplink data packet and a second uplink data packet, wherein a source address of the first uplink data packet is the same as a source address of the second uplink data packet; and the routing method further includes: detecting, by the current relay node, whether the first uplink data packet and the second uplink data packet are repetitive data packets according to a packet data aggregation protocol (PDCP) layer sequence number of the data packet.

In a possible implementation manner, the forwarding, by the current relay node, the uplink data packet to the upper-level relay node serving the current relay node, includes: when the first uplink data packet and the second uplink data packet are repetitive data packets, sending, by the current relay node, the first uplink data packet or the second uplink to the upper-level relay node; or when the first uplink data packet and the second uplink data packet are non-repetitive data packets, sending, by the current relay node, the first uplink data packet and the second uplink data packet to the upper-level relay node.

In a possible implementation manner, the header of the uplink data packet includes first information, and the first information is used to indicate a source address and/or a destination address.

In a possible implementation manner, the header of the uplink data packet is outside a header of a packet data aggregation protocol (PDCP) protocol data unit (PDU).

In a ninth aspect, a communication node is provided for performing the method in the foregoing seventh aspect or any possible implementation manner of the seventh aspect. Specifically, the communication node includes a unit for performing the method in the seventh aspect or any possible implementation manner of the seventh aspect.

In a tenth aspect, a communication node is provided for performing the method in the foregoing eighth aspect or any possible implementation manner of the eighth aspect. Specifically, the communication node includes a unit for performing the method in the above eighth aspect or any possible implementation manner of the eighth aspect.

In an eleventh aspect, a communication node is provided. The communication node includes: a memory, a processor, an input interface, and an output interface. The memory, the processor, the input interface and the output interface are connected through a bus system. The memory is configured to store instructions, and the processor is configured to execute the instructions stored in the memory, to perform the method in the seventh aspect or any possible implementation manner of the seventh aspect.

In a twelfth aspect, a communication node is provided. The communication node includes: a memory, a processor, an input interface, and an output interface. The memory, the processor, the input interface and the output interface are connected through a bus system. The memory is configured to store instructions, and the processor is configured to execute the instructions stored in the memory, to perform the method in the above eighth aspect or any possible implementation manner of the eighth aspect.

In a thirteenth aspect, a chip is provided for implementing the method in the first aspect or any possible implementation manner of the first aspect, or the method in the seventh aspect or any possible implementation manner of the seventh aspect.

Specifically, the chip includes: a processor for calling and running a computer program from the memory, so that a device installed with the chip executes the method in the first aspect or any possible implementation manner of the first aspect, or the method in the above seventh aspect or any possible implementation manner of the seventh aspect.

In a fourteenth aspect, a chip is provided for implementing the method in the second aspect or any possible implementation manner of the second aspect, or the method in the eighth aspect or any possible implementation manner of the eighth aspect.

Specifically, the chip includes: a processor for calling and running a computer program from the memory, so that a device installed with the chip executes the method in the second aspect or any possible implementation manner of the second aspect, or the method in the above eighth aspect or any possible implementation manner of the eighth aspect.

In a fifteenth aspect, a computer storage medium is provided for storing the method in the first aspect or any possible implementation manner of the first aspect, or the method in the second aspect or any possible implementation of the second aspect, or the method in the above seventh aspect or any possible implementation manner of the seventh aspect, or the computer software instruction used by the method in the above eighth aspect or any possible implementation manner of the eighth aspect, which includes the program designed for executing the above aspects.

In a sixteenth aspect, there is provided a computer program product including instructions that, when run on a computer, cause the computer to execute the method in the first aspect or any optional implementation manner of the first aspect, or he method in the above second aspect or any optional implementation manner of the second aspect, or the method in the above seventh aspect or any possible implementation manner of the seventh aspect, or the method in the above eighth aspect or any possible implementation manner of the eighth aspect.

These or other aspects of the present application will be more concise and understandable in the following description of the embodiments.

BRIEF DESCRIPTION OF THE DRAWINGS

FIG. 5 shows another schematic block diagram of the communication node of the embodiment of the present application.

FIG. 6 shows yet another schematic block diagram of the communication node of the embodiment of the present application.

FIG. 7 shows yet another schematic block diagram of the communication node of the embodiment of the present application.

FIG. 8 shows a schematic block diagram of a data processing method of a relay network according to an embodiment of the present application.

FIG. 9 shows yet another schematic block diagram of the relay routing method according to the embodiment of the present application.

DETAILED DESCRIPTION

The technical solutions in the embodiments of the present application will be described clearly and completely in conjunction with the drawings in the embodiments of the present application.

It should be understood that the technical solutions of the embodiments of the present application can be applied to various communication systems, such as: a Global System of Mobile Communication (GSM) system, a Code Division Multiple Access (CDMA) system, a Wideband Code Division Multiple Access (WCDMA) system, General Packet Radio Service (GPRS), a long-term evolution LTE system, a LTE Frequency Division Duplex (FDD) system, LTE Time Division Duplex (TDD), a Universal Mobile Telecommunication System (UMTS), a Global Interoperability for Microwave Access (WiMAX) communication system, New Radio (NR) or future 5G System etc.

In particular, the technical solutions of the embodiments of the present application can be applied to various communication systems based on non-orthogonal multiple access technology, such as a Sparse Code Multiple Access (SCMA) system and a Low Density Signature (LDS) system, etc. The SCMA system and the LDS system can also be called other names in the communication field. Further, the technical solutions of the embodiments of the present application can be applied to multi-carrier transmission systems using non-orthogonal multiple access technology, such as Orthogonal Frequency Division Multiplexing (OFDM), Filter Bank Multi-Carrier (FBMC), Generalized Frequency Division Multiplexing (GFDM), Filtered Orthogonal Frequency Division Multiplexing (Filtered-OFDM, F-OFDM) system, etc.

Figure 1:
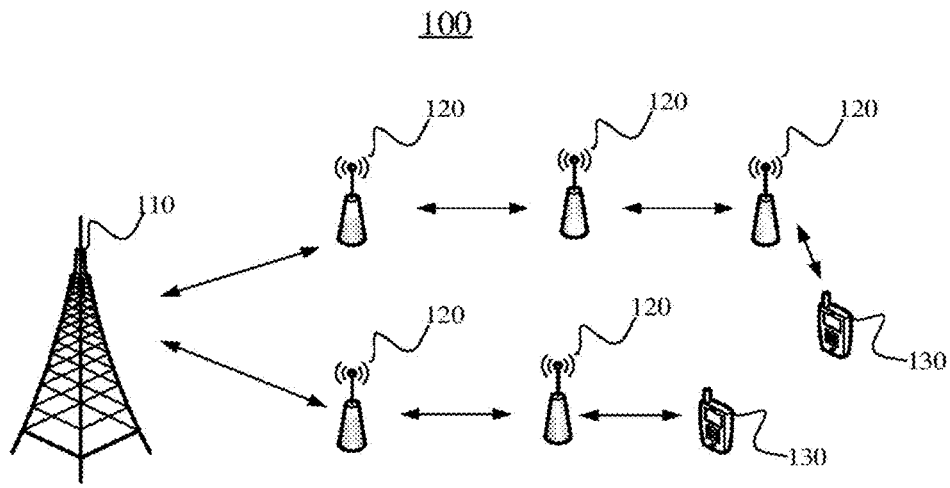
FIG. 1 shows a schematic diagram of an application scenario according to an embodiment of the present application.

FIG. 1 shows a wireless communication system 100 applied in the embodiments of the present application. The wireless communication system 100 may include a central node 110. The central node 110 may be an anchor node, that is, a fixed node (donor node). The central node 110 may be connected to a network device in a wired manner. The central node 110 per se may also be a fixedly accessed access network node or a core network node. The wireless communication system 100 may further include one or more relay nodes 120, and the relay node 120 may be wirelessly connected to the central node 110 for forwarding data packets between the terminal and the network. The wireless communication system 100 may also include one or more terminal devices 130. In FIG. 1, it can be considered that in two connected relay nodes 120, one relay node with fewer hops to the network device is a parent node of the other relay node with more hops to the network device. Similarly, one relay node with more hops from the network device is a child node of the relay node with fewer hops from the network device.

The terminal device in the embodiments of the present application may refer to User Equipment (UE), an access terminal, a user unit, a user station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a Personal Digital Assistant (PDA), a handheld device or a computing device having a wireless communication function or other processing devices connected to wireless modems, an in-vehicle device, a wearable device, a terminal device in future 5G networks or a terminal device in future evolved Public Land Mobile Network (PLMN) and the like, which are not limited in the embodiments of the present application.

The network device in the embodiments of the present application may be a device for communicating with the terminal device. The network device may be a base station (Base Transceiver Station, BTS) in GSM or CDMA, or a base station (NodeB, NB) in WCDMA system, it can also be an evolutionary base station (Evolutional NodeB, eNB or eNodeB) in the LTE system, it can also be a wireless controller in the Cloud Radio Access Network (CRAN) scenario, or the network device can be a relay station, an access point, an in-vehicle device, a wearable device, a network device in the future 5G network or a network device in the future evolved PLMN network, etc., which are not limited in the embodiments of the present application.

FIG. 1 exemplarily shows one central node, five relay nodes, and two terminal devices. Optionally, the wireless communication system 100 may include a plurality of relay nodes, and each relay node may be connected to other numbers of the terminal devices, which is not limited by the embodiments of the present application.

It should be understood that the embodiments of the present application are not limited to the relay extension between the network nodes shown in FIG. 1, but can also be applied to the relay extension between the terminal devices.

For example, there may be one or more relay nodes from one terminal device to another terminal device for forwarding data packets.

Figure 2:
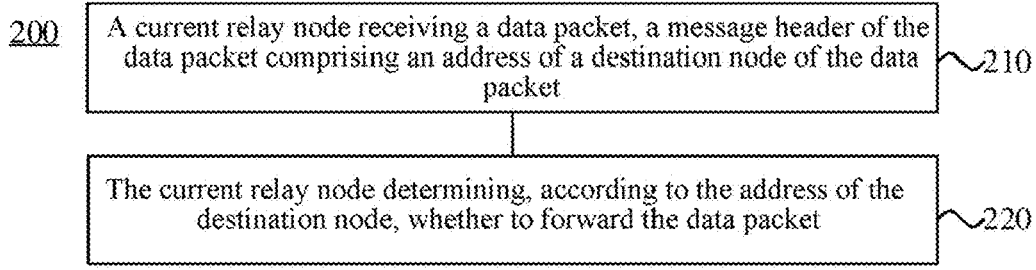
FIG. 2 shows a schematic block diagram of a relay routing method according to an embodiment of the present application.

FIG. 2 shows a schematic block diagram of a relay routing method 200 according to an embodiment of the present application. The current relay node shown in FIG. 2 may be the relay node 120 shown in FIG. 1, and the routing method 200 includes some or all of the following contents.

In S210, the current relay node receives a data packet, where a header of the data packet includes an address of a destination node of the data packet.

In S220, the current relay node determines whether to forward the data packet according to the address of the destination node.

It should be noted that the current relay node in the embodiment of the present application may be a relay node that is directly and wirelessly connected to the central node through a relay layer as shown in FIG. 1, or may be a relay node that is directly and wirelessly connected to the relay node through the relay layer, or may be a relay node that is directly and wirelessly connected to the terminal device through the relay layer. The relay layer of the relay node may be in an entity with the Packet Data Convergence Protocol (PDCP) layer, or it may be an entity independent of PDCP. Therefore, the header of the data packet in this embodiment of the present application may be in the header of the PDCP Protocol Data Unit (PDU), or may be outside the header of the PDCP PDU. It should be understood that the data packet may be an uplink data packet, or a downlink data packet, or both an uplink data packet and a downlink data packet. In addition to the address of the destination node of the data packet, the header of the data packet may also include an address of a source node of the data packet. Taking the downlink data packet as an example, the current relay node receives the data packet sent by the parent node of the current relay node, and the current relay node may determine whether the data packet belongs to itself according to the address of the destination node of the data packet carried in the header of the received data packet. If the data packet belongs to itself, the current relay node may directly process the data; and if not, the current relay node may continue to forward according to the address of the destination node. It should be understood that the address of the destination node may be the address of the terminal device to which the data packet belongs, or the address of the relay node directly connected to the terminal device to which the data packet belongs. The address of the destination node may not only include the address of the terminal device to which the data packet belongs, but also include the address of the relay node directly connected to the terminal device to which the data packet belongs.

Therefore, the relay routing method according to the embodiment of the present application is beneficial to improve the performance of the relay network.

Optionally, in the embodiment of the present application, the routing method further includes: in a case where the current relay node determines to forward the data packet, the current relay node determining to forward the data packet to at least one relay node.

When the current relay node determines that the data packet does not belong to itself, the current relay node will forward the data packet. For example, when the data packet is an uplink data packet, the current relay node may directly forward the data packet to its parent node. There may be a plurality of parent nodes connected to the current relay node, so the current relay node may select one or more relay nodes to forward.

Optionally, in the embodiment of the present application, before the current relay node receives the data packet, the routing method further includes: the current relay node receiving a routing table sent by a central node, where the routing table is used to indicate a transmission path of the data packet from the source node to the destination node; and the current relay node determining to forward the data packet to at least one relay node includes: the current relay node determining to forward the data packet to the at least one relay node according to the routing table.

The central node may deliver a topology relationship between a certain terminal device and the central node, that is, a routing table in the embodiment of the present application, to the relay node on the transmission path in advance. It should be understood that there may be more than one path between the certain terminal device and the center node, and the central node may deliver the routing table to the relay nodes on each path. When the current relay node receives a certain data packet and determines that the data packet needs to be forwarded, the current relay node can determine which relay node to forward the data packet according to the routing table. It should be understood that if the current relay node is a relay node directly connected to the terminal device to which the data packet belongs, that is to say, there is only one hop between the destination node of the data packet and the current relay node, then the current relay node can directly forward to the terminal device without using the routing table. Similarly, when the data packet is an uplink data packet, because the destination address of the data packet must be a network device at this time, the current relay node can also directly forward the data packet to any one or more of its parent nodes without using the routing table.

Optionally, in the embodiment of the present application, the current relay node determining to forward the data packet to the at least one relay node includes: the current relay node determining to forward the data packet to the at least one relay node according to a channel quality.

Specifically, when the current relay node determines that there are a plurality of next-hop relay nodes of the data packet, the current relay node may directly select one or more of them according to the channel quality of each next-hop relay node to forward the data packet.

Optionally, in the embodiment of the present application, the routing method further includes: in the case where the current relay node fails, the current relay node reporting failure information to the central node, so that the central node updates the routing table, where the routing table is used to indicate the transmission path of the data packet from the source node to the destination node.

Specifically, when the connection of any relay node fails, the relay node can report to the central node, and then the central node can re-update the routing table according to the failure information, and deliver the updated routing table to the relevant relay nodes. In other words, the central node can continuously update the routing table according to the real-time connection status.

Optionally, in the embodiment of the present application, the address of the destination node and/or the address of the source node of the data packet may be allocated by the central node.

The solution of the present application will be described in detail below in conjunction with the following several embodiments.

First embodiment: the current relay node receives the data packet, including: the current relay node receiving a first data packet and a second data packet, where the address of the destination node of the first data packet and the destination node of the second data packet are the same; and the current relay node determining to forward the data packet to at least one relay node includes: the current relay node determining to forward the first data packet to a first relay node of the at least one relay node, and the current relay node determining to forward the second data packet to a second relay node of the at least one relay node. In other words, the current relay node can receive a plurality of data packets belonging to the same destination node, and forward the plurality of data packets to the plurality of relay nodes in a one-to-one correspondence.

Second embodiment: the current relay node receives a data packet, including: the current relay node receiving a first data packet; and the routing method further includes: the current relay node copying the first data packet; and the current relay node determining to forward the data packet to at least one relay node includes: the current relay node determining to forward the first data packet to the first relay node in the at least one relay node, and determining to forward the copied first data packet to the second relay node in the at least one relay node. In other words, the current relay node has the function of copying data, and can copy the received data packet into multiple data packets, and forward the copied multiple data packets to the multiple relay nodes in a one-to-one correspondence.

Third embodiment: the current relay node receives a data packet, including: the current relay node receiving a first data packet; and the routing method further includes: the current relay node copying the first data packet; and the current relay node determining to forward the data packet to at least one relay node includes: the current relay node determining to use the first logical channel to forward the first data packet to the first relay node in the at least one relay node, and determining to use the second logical channel to forward the copied first data packet to the first relay node. Similarly, the current relay node has the function of copying data, can copy the received data packet into multiple data packets, and use multiple logical channels to forward the copied multiple data packets to the same relay node one by one correspondingly. Alternatively, it is possible to use multiple logical channels to forward multiple copied data packets to different relay nodes in a one-to-one correspondence.

Fourth embodiment: the current relay node receives a data packet, including: the current relay node receiving the first data packet using the first logical channel; and the current relay node determining to forward the data packet to at least one relay node includes: the current relay node uses the first logical channel to forward the first data packet to the at least one relay node. That is to say, through which logical channel the current relay node receives the data packet, this logical channel can still be used to forward the data packet to at least one relay node.

Fifth embodiment: the current relay node receives a data packet, including: the current relay node receives the first data packet using the first logical channel; and the current relay node determining to forward the data packet to at least one relay node includes: the current relay node using the second logical channel to forward the first data packet to the at least one relay node according to configuration information. In other words, after receiving the data packet through a logical channel, the current relay node may select another logical channel to forward the data packet based on a certain rule. The rule may be, for example, a routing table configured by the central node.

Sixth embodiment: the current relay node receives the data packet, including: the current relay node receiving the first data packet using the first logical channel; and the current relay node determining to forward the data packet to at least one relay node includes: the current relay node forwarding the first data packet to the at least one relay node using the second logical channel according to an instruction of the relay layer. Similarly, after receiving the data packet through a logical channel, the current relay node may select another logical channel to forward the data packet based on the instruction of the relay layer. For example, an identifier of the logical channel may be carried in the header of the data packet. The current relay node can also determine which logical channel to use to forward the data packet based on the information configured by the central node and the instruction of the relay layer.

Seventh embodiment: the current relay node receives the data packet, including: the current relay node receiving the first data packet and the second data packet, where the address of the destination node of the first data packet and the destination node of the second data packet are the same; and the current relay node determining to forward the data packet to at least one relay node includes: the current relay node determining to forward the first data packet to the first relay node in the at least one relay node, and the current relay node determining to forward the second data packet to the first relay node. In other words, the current relay node can receive multiple data packets belonging to the same destination node and forward the multiple data packets to the same relay node.

Eighth embodiment: the current relay node receives the data packet, including: the current relay node receiving the first data packet and the second data packet, where the address of the destination node of the first data packet and the destination node of the second data packet are the same; the routing method further includes: the current relay node detecting whether the first data packet and the second data packet are repetitive data packets according to the PDCP layer sequence number of the data packet; and the current relay node determining to forward the data packet to at least one relay node includes: if the first data packet and the second data packet are the repetitive (duplicate) data packets, the current relay node determining to send the first data packet or the second data packet to the at least one relay node; or if the first data packet and the second data packet are not the duplicate data packets, the current relay node determining to send the first data packet and the second data packet to the at least one relay node. In other words, the relay node has the function of detecting repetitive data packets. When the relay node receives multiple data packets belonging to the same destination node, the relay node detects whether there are repetitive data packets among the multiple data packets, particularly by determining whether the PDCP Service Data Unit (SDU) has the same or different sequence numbers. If there are the same sequence numbers, they are repetitive data packets, and if the sequence numbers are different, they are non-repetitive data packets. When the relay node detects that some data packets are repeated, the relay node forwards the repeated data packets only once, that is to say, the repeated data packets can be discarded. When the relay node detects that multiple data packets are not repetitive, the relay node can directly forward the multiple data packets.

Figure 3:
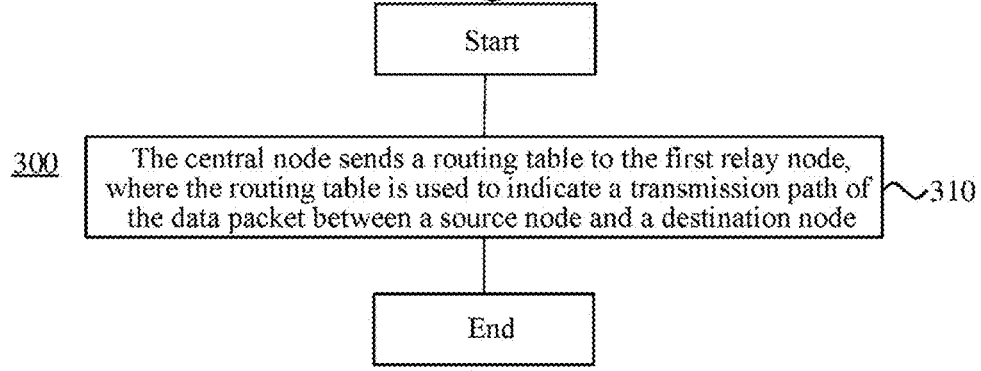
FIG. 3 shows another schematic block diagram of the relay routing method according to the embodiment of the present application.

FIG. 3 shows a schematic block diagram of a relay routing method 300 according to an embodiment of the present application. As shown in FIG. 3, the method 300 includes some or all of the following contents.

In S310, a central node sends a routing table to a first relay node, where the routing table is used to indicate a transmission path of a data packet between a source node and a destination node.

Therefore, the relay routing method according to the embodiment of the present application is beneficial to improve the performance of the relay network.

Optionally, in the embodiment of the present application, the routing method further includes: in a case where the first relay node fails, the central node receiving failure information reported by the first relay node; and the central node updating the routing table according to the failure information.

Optionally, in the embodiment of the present application, the central node is an anchor node, a fixed-access access network node, or a core network node.

It should be understood that the terms "system" and "network" are often used interchangeably herein. The term "and/or" herein just describes an association relationship of associated objects, indicating that there may be three relationships, for example, A and/or B may mean the following three cases: A exists alone, A and B exist at the same time, and B exists alone. In addition, the character "/" herein generally indicates that the associated objects are in an "or" relationship.

It should be understood that the interaction and related characteristics and functions between the center node and the current relay node described by the center node correspond to the related characteristics and functions of the current relay node. The related content has been described in detail in the above method 200, and for the sake of brevity, no more details will be given here.

It should also be understood that, in various embodiments of the present application, the size of the sequence numbers of the above processes does not mean the execution order, the execution order of each process should be determined by its function and inherent logic, and the implementation process of the embodiments of the present application should not be limited.

The relay routing method according to an embodiment of the present application is described in detail above. The following will describe a routing device of a relay network according to an embodiment of the present application with reference to FIGS. 4 to 7. The technical features described in the method embodiment are applicable to the following device embodiments.

Figure 4:
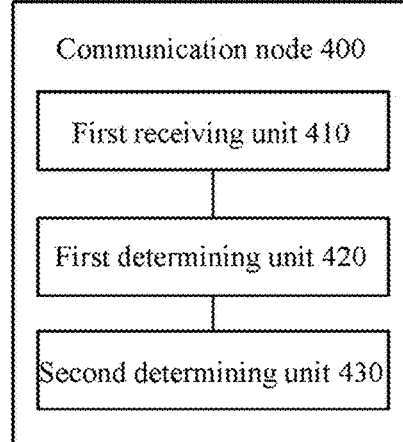
FIG. 4 shows a schematic block diagram of a communication node according to an embodiment of the present application.

FIG. 4 shows a schematic block diagram of a communication node 400 according to an embodiment of the present application. As shown in FIG. 4, the communication node 400 is a current relay node, and the communication node 400 includes:

a first receiving unit 410, configured to receive a data packet, where a header of the data packet includes an address of a destination node of the data packet; and a first determining unit 420, configured to determine whether to forward the data packet according to the address of the destination node.

Therefore, the communication node of the embodiment of the present application is beneficial to improve the performance of the relay network.

It should be understood that the communication node 400 according to the embodiment of the present application may correspond to the current relay node in the method embodiment of the present application, and the above and other operations and/or functions of each unit in the communication node 400 are to implement the corresponding process of the communication node in the method of FIG. 2 respectively. For the sake of brevity, details are not repeated here.

FIG. 5 shows a schematic block diagram of a communication node 500 according to an embodiment of the present application. As shown in FIG. 5, the communication node 500 is a central node, and the communication node 500 includes:

a sending unit 510, configured to send a routing table to the first relay node, where the routing table is used to indicate a transmission path of a data packet between the source node and the destination node.

Therefore, the communication node of the embodiment of the present application is beneficial to improve the performance of the relay network.

It should be understood that the communication node 500 according to the embodiment of the present application may correspond to the central node in the method embodiment of the present application, and the above-mentioned and other operations and/or functions of each unit in the communication node 500 are respectively for realizing the corresponding process of the communication node in the method of FIG. 3. For the sake of brevity, details are not repeated here.

As shown in FIG. 6, an embodiment of the present application further provides a communication node 600. The communication node 600 may be the communication node 400 in FIG. 4, which can be used to execute the contents of the current relay node corresponding to the method 100 in FIG. 2. The communication node 600 includes: an input interface 610, an output interface 620, a processor 630, and a memory 640. The input interface 610, the output interface 620, the processor 630, and the memory 640 may be connected through a bus system. The memory 640 is configured to store programs, instructions or codes. The processor 630 is configured to execute the programs, the instructions, or the codes in the memory 640 to control the input interface 610 to receive signals, control the output interface 620 to send signals, and complete operations in the foregoing method embodiments.

Therefore, the communication node of the embodiment of the present application is beneficial to improve the performance of the relay network.

It should be understood that in the embodiment of the present application, the processor 630 may be a Central Processing Unit (CPU), and the processor 630 may also be other general-purpose processors or a Digital Signal Processor (DSP), an Application Specific Integrated Circuit (ASIC), a Field Programmable Gate Array (FPGA) or other programmable logic device, discrete gate or transistor logic device, discrete hardware components, etc. The general-purpose processor may be a microprocessor or the processor may be any conventional processor or the like.

The memory 640 may include a read-only memory and a random access memory, and provide instructions and data to the processor 630. A portion of the memory 640 may also include a non-volatile random access memory. For example, the memory 640 may also store device type information.

In the implementation process, each content of the above method may be completed by an integrated logic circuit of hardware or instructions in the form of software in the processor 630. The content of the method disclosed in conjunction with the embodiments of the present application may be directly embodied and executed by a hardware processor, or may be executed and completed by a combination of hardware and software modules in the processor. The software module may be located in a mature storage medium in the art, such as a random access memory, a flash memory, a read-only memory, a programmable read-only memory, or an electrically erasable programmable memory, and a register. The storage medium is located in the memory 640, and the processor 630 reads the information in the memory 640 and completes the contents of the above method with its hardware. In order to avoid repetition, details will not be described here.

In a specific embodiment, the first determining unit, the second determining unit, the third determining unit, the processing unit, and the detection unit in the communication node 400 may be implemented by the processor 630 in FIG. 6, the reporting unit of the communication node 400 may be implemented by the output interface 620 in FIG. 6, and the first receiving unit and the second receiving unit of the communication node 400 may be implemented by the input interface 610 in FIG. 6.

As shown in FIG. 7, an embodiment of the present application further provides a communication node 700. The communication node 700 may be the communication node 500 in FIG. 5, which can be used to execute the content of the central node corresponding to the method 200 in FIG. 3. The communication node 700 includes an input interface 710, an output interface 720, a processor 730, and a memory 740. The input interface 710, the output interface 720, the processor 730, and the memory 740 may be connected through a bus system. The memory 740 is configured to store programs, instructions or codes. The processor 730 is configured to execute the programs, the instructions, or the codes in the memory 740 to control the input interface 710 to receive signals, control the output interface 720 to send signals, and complete operations in the foregoing method embodiments.

Therefore, the communication node of the embodiment of the present application is beneficial to improve the performance of the relay network.

It should be understood that in the embodiments of the present application, the processor 730 may be a Central Processing Unit (CPU), and the processor 730 may also be other general-purpose processors or a Digital Signal Processor (DSP), an Application Specific Integrated Circuit (ASIC), a Field Programmable Gate Array (FPGA) or other programmable logic devices, discrete gates or transistor logic devices, discrete hardware components, etc. The general-purpose processor may be a microprocessor or the processor may be any conventional processor or the like.

The memory 740 may include a read-only memory and a random access memory, and provide instructions and data to the processor 730. A portion of the memory 740 may also include a non-volatile random access memory. For example, the memory 740 may also store device type information.

In the implementation process, each content of the above method may be completed by an integrated logic circuit of hardware or instructions in the form of software in the processor 730. The content of the method disclosed in conjunction with the embodiments of the present application may be directly embodied and executed by a hardware processor, or may be executed and completed by a combination of hardware and software modules in the processor. The software module may be located in a mature storage medium in the art, such as a random access memory, a flash memory, a read-only memory, a programmable read-only memory, or an electrically erasable programmable memory, and a register. The storage medium is located in the memory 740. The processor 730 reads the information in the memory 740 and completes the content of the above method in combination with its hardware. In order to avoid repetition, details will not be described here.

In a specific embodiment, the sending unit in the communication node 500 may be implemented by the output interface 720 in FIG. 7, and the receiving unit in the communication node 500 may be implemented by the input interface 710 in FIG. 7. The processing unit in the communication node 500 may be implemented by the processor 730 in FIG. 7.

In the LTE system, the backhaul links (Backhaul) between the base stations, and the base station and the core network use a wired connection, which brings a relatively great deployment difficulty and high network deployment costs to the operator. In order to solve the above problem, the 3rd Generation Partnership Project (3GPP) initiated research on wireless relay technology in the LTE-A standardization phase to provide a wireless backhaul link solution.

The relay system is an Integrated Access and Backhaul link (IAB). The Relay Node (RN) is wirelessly connected to an eNB cell to which the RN belongs, and is also known as an IAB-node, the cell to which the RN belongs is called a Donor cell, and the eNB to which the relay node belongs is called a Donor eNB (DeNB), and is also known as an IAB-donor. It mainly includes 3 wireless links: a Backhaul link between RN and DeNB, an Access link between UE and RN, a Direct link between UE and eNB. The network architecture of the relay system can be shown in FIG. 1.

FIG. 8 shows a schematic block diagram of a data processing method 800 of a relay network according to an embodiment of the present application. The network anchor node shown in FIG. 8 may be the central node 110 shown in FIG. 1, that is, IAB-donor. The method 800 includes some or all of the following contents.

In S810, the network anchor node receives a data packet, and the header of the data packet includes first information, where the first information is used to indicate the source address of the data packet.

In S820, the network anchor node determines the source address of the data packet according to the first information.

Specifically, the network anchor node, that is, IAB-donor, can receive a data packet, which can be an uplink data packet, a downlink data packet, or a plurality of data packets, including an uplink data packet and a downlink data packet. The header of each data packet includes information indicating the source address of the corresponding data packet. For example, the data packet is an uplink data packet, that is, the data packet may be directly sent by the terminal device to the network anchor node, then the source address of the data packet is considered to be the address of the terminal device, and the data packet can also be sent by the relay node to the network anchor node, then the source address of the data packet can be considered as the address of the relay node. For another example, the data packet is a downlink data packet, and the data packet may be sent by the core network device, then the source address of the data packet may be the address of the core network.

After acquiring the source address of the data packet, the network anchor node may further process the data packet. Taking the uplink data packet as an example, if the network anchor node receives a plurality of data packets and obtains the source addresses of the plurality of data packets, the network anchor node can determine whether the source addresses of the plurality of data packets are the same address. If the source addresses of the plurality of data packets are the same address, the plurality of data packets can be sent to the upper layer corresponding to the source address for processing; and if not, the plurality of data packets can be separately sent to the upper layers corresponding to different source addresses for processing. The specific processing by the network anchor node after obtaining the source address of the data packet is not limited in the embodiments of the present application and will not be described in detail here.

Optionally, in the embodiments of the present application, the first information is used to indicate at least one of the following information: a type of a node that sends the uplink data packet, the type including a terminal device or a relay node; an address of a terminal device that sends the uplink data packet; and an address of the relay node that sends the uplink data packet. In other words, the uplink data packet may be directly sent by the terminal device to the network anchor node, or may be sent by the relay node to the network anchor node.

FIG. 9 shows a schematic block diagram of a relay routing method 900 according to an embodiment of the present application. The network anchor node shown in FIG. 9 may be the relay node 120 shown in FIG. 1, that is, the IAB-node. The method 900 includes some or all of the following contents.

In S910, the current relay node receives an uplink data packet.

In S920, the current relay node forwards the uplink data packet to an upper-level relay node serving the current relay node.

Figure 10:
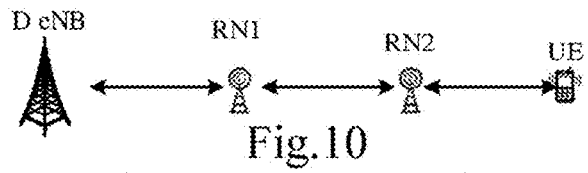
FIG. 10 shows a network architecture diagram of a relay system.

In the relay system, an upper-level node of a certain node is also called a parent node, and a lower-level node of the certain node is also called a child node. In a relay system supporting multi-hop, as shown in FIG. 10, for RN1, DeNB is a parent node, and RN2 is a child node, and for RN2, RN1 is a parent node, and UE is a child node.

Specifically, when a certain relay node receives an uplink data packet, the relay node may directly forward the data packet to the upper-level relay node. If a certain relay node receives a data packet sent by its parent node, it can consider the data packet to be a downlink data packet, and if a certain relay node receives a data packet sent by its child node, it can consider the data packet to be an uplink data packet. After the relay node receives the uplink data packet, the relay node can forward the uplink data packet to its parent node. Each relay node may have multiple parent nodes. When the relay node receives multiple data packets, it can select one of the parent nodes to forward or forward to multiple parent nodes.

Optionally, the header of the uplink data packet may further include the source address and/or destination address of the uplink data packet. When the relay node receives the uplink data packet, it can determine whether the uplink data packet belongs to itself according to the destination address, and then can process the data packet. Similarly, the relay node can also process the data packet according to the source address of the data packet. For example, the uplink data packets belonging to the same source address are sent to the same upper-level relay node.

The relay layer of the relay node may be in an entity with the Packet Data Convergence Protocol (PDCP) layer, and may also be an entity independent of PDCP. Therefore, the header of the data packet in this embodiment of the present application may be in the header of the PDCP Protocol Data Unit (PDU), or may be outside the header of the PDCP PDU.

The solution of the present application will be described in detail below in conjunction with the following embodiments.

First embodiment: the current relay node receives the uplink data packet, including: the current relay node receiving a first uplink data packet; the routing method further includes: the current relay node copies the first uplink data packet; the upper-level relay node includes a first relay node and a second relay node, and the current relay node forwards the uplink data packet to the upper-level relay node serving the current relay node, including: the current relay node forwarding the first uplink data packet to the first relay node, and forwarding the copied first uplink data packet to the second relay node. In other words, the current relay node has the function of copying data, can copy the received uplink data packet into multiple uplink data packets, and forward the copied multiple uplink data packets to multiple upper-level relay nodes in a one-to-one correspondence.

Second embodiment: the current relay node receives the uplink data packet, including: the current relay node receiving the first uplink data packet; the routing method further includes: the current relay node copying the first uplink data packet; the upper-level relay node includes a first relay node, and the current relay node forwards the uplink data packet to the upper-level relay node serving the current relay node, including: the current relay node using the first logical channel to forward the first uplink data packet to the first relay node, and forwarding the copied first uplink data packet to the first relay node using a second logical channel. Similarly, the current relay node has the function of copying data, can copy the received uplink data packet into multiple uplink data packets, and use multiple logical channels to forward the copied multiple uplink packets to the same upper-level relay node in one-to-one correspondence. Alternatively, multiple logical channels can be used to forward multiple copied uplink data packets to different relay nodes in one-to-one correspondence.

Third embodiment: the current relay node receives the uplink data packet, including: the current relay node receiving the first uplink data packet using the first logical channel; and the current relay node forwards the uplink data packet to the upper-level relay node serving the current relay node, including: the current relay node forwarding the first uplink data packet to the upper-level relay node using the first logical channel. That is, the logical channel through which the current relay node receives the uplink data packet may still be used to forward the uplink data packet to at least one upper-level relay node.

Fourth embodiment: the current relay node receives the uplink data packet, including: the current relay node using the first logical channel to receive the first uplink data packet; and the current relay node forwards the first uplink data packet to the upper-level relay node serving the current relay node, including: the current relay node forwarding the first uplink data packet to the upper-level relay node using the second logical channel according to the configuration information. In other words, after receiving the uplink data packet through a logical channel, the current relay node may select another logical channel to forward the data packet based on a certain rule. The rule may be, for example, a routing table configured by the network anchor node.

Fifth embodiment: the current relay node receives the uplink data packet, which includes: the current relay node using the first logical channel to receive the first uplink data packet; and the current relay node forwards reports the uplink data packet to the upper-level relay node serving the current relay node, including: the current relay node forwarding the first uplink data packet to the upper-level relay node using a second logical channel according to an instruction of the relay layer. Similarly, after receiving the uplink data packet through a logical channel, the current relay node may select another logical channel to forward the uplink data packet based on the instruction of the relay layer. For example, the identifier of the logical channel may be carried in the header of the data packet. The current relay node can also determine which logical channel to use to forward the uplink data packet according to both the information configured by the network anchor node and the instruction of the relay layer.

Sixth embodiment: the upper-level relay node includes a first relay node and a second relay node, and the current relay node receives the uplink data packet, including: the current relay node receiving the first uplink data packet and the second uplink data packet, the source address of the first uplink data packet being the same as the address of the source node of the second uplink data packet; and the current relay node forwards the uplink data packet to an upper-level relay node serving the current relay node, including: the current relay node forwarding the first uplink data packet to the first relay node, and the current relay node forwarding the second uplink data packet to the first relay node. In other words, the current relay node can receive multiple uplink data packets belonging to the same source node, and forward the multiple uplink data packets to the same upper-level relay node.

Seventh embodiment: the current relay node receives the uplink data packet, including: the current relay node receiving the first uplink data packet and the second uplink data packet, the source address of the first uplink data packet and the source address of the second uplink data packet being the same; the routing method further includes: the current relay node detecting whether the first uplink data packet and the second uplink data packet are repetitive data packets according to the packet data aggregation protocol (PDCP) layer sequence number of the data packet; and the current relay node forwards the uplink data packet to the upper-level relay node serving the current relay node, including: if the first uplink data packet and the second uplink data packet are repetitive data packets, the current relay node sending the first uplink data packet or the second uplink data packet to the upper-level relay node; or if the first uplink data packet and the second uplink data packet are non-repetitive data packets, the current relay node sending the first uplink data packet and the second uplink data packet to the upper-level relay node. Specifically, it can be determined whether the PDCP Service Data Unit (SDU) has the same or different sequence numbers. If the PDCP SDU has the same sequence numbers, the first uplink data packet and the second uplink data packet are repetitive data packets, and if the PDCP SDU has not the same sequence numbers, the first uplink data packet and the second uplink data packet are non-repetitive data packets. When the relay node detects that some uplink data packets are repetitive, the relay node forwards the repetitive data packets only once, that is to say, the repetitive data packets can be discarded. When the relay node detects that multiple data packets are not repetitive, the relay node can directly forward the multiple data packets.

The data processing method of the relay network and the relay routing method according to the embodiments of the present application have been described in detail above. The following describes the apparatus according to the embodiments of the present application in conjunction with FIGS. 11 to 14, and the technical features described in the method embodiments are applicable to the following apparatus embodiments.

Figure 11:
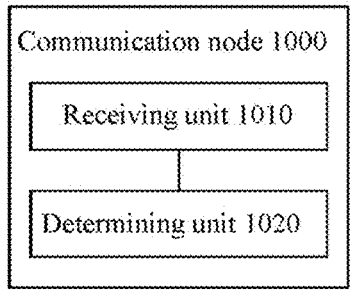
FIG. 11 shows yet another schematic block diagram of the communication node of the embodiment of the present application.

FIG. 11 shows a schematic block diagram of a communication node 1000 according to an embodiment of the present application. The communication node 1000 is a network anchor node. As shown in FIG. 11, the communication node 1000 includes:

a receiving unit 1010, configured to receive a data packet, a header of the data packet including first information, and the first information being used to indicate a source address of the data packet; and a determining unit 1020, configured to determine the source address of the data packet according to the first information.

Specifically, optionally, in the embodiments of the present application, the data packet is an uplink data packet.

Optionally, in the embodiments of the present application, the first information is used to indicate at least one of the following information: a type of the node that sends the uplink data packet, the type including a terminal device or a relay node; an address of a terminal device that sends the uplink data packet; and an address of a relay node that sends the uplink data packet.

Optionally, in the embodiments of the present application, the communication node further includes: a processing unit, configured to process the data packet according to the source address of the data packet.

It should be understood that the communication node 1000 according to the embodiment of the present application may correspond to the network anchor node in the method embodiments of the present application, and the above-mentioned and other operations and/or functions of each unit in the communication node 1000 respectively implement the corresponding process of the network anchor node in the method of FIG. 8. For brevity, the details are not repeated here.

Figure 12:
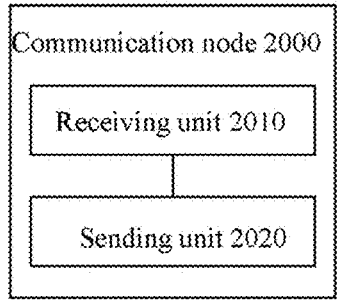
FIG. 12 shows yet another schematic block diagram of the communication node of the embodiment of the present application.

FIG. 12 shows a schematic block diagram of a communication node 2000 according to an embodiment of the present application. The communication node 2000 is a current relay node. As shown in FIG. 12, the communication node 2000 includes:

a receiving unit 2010, configured to receive an uplink data packet; and a sending unit 2020, configured to forward the uplink data packet to an upper-level relay node serving the current relay node.

Optionally, in the embodiments of the present application, the receiving unit is specifically configured to: receive the first uplink data packet; and the communication node further includes: a copy unit, configured to copy the first uplink data packet.

Optionally, in the embodiments of the present application, the upper-level relay node includes a first relay node and a second relay node, and the sending unit is specifically configured to: forward the first uplink data packet to the first relay node, and forward the copied first uplink data packet to the second relay node.

Optionally, in the embodiments of the present application, the upper-level relay node includes a first relay node, and the sending unit is specifically configured to: forward the first uplink data packet to the first relay node using a first logical channel, and forward the copied first uplink data packet to the first relay node using a second logical channel.

Optionally, in the embodiments of the present application, the receiving unit is specifically configured to: receive the first uplink data packet using the first logical channel; and the sending unit is specifically configured to: use the first logical channel to forward the first uplink data packet to the upper-level relay node.

Optionally, in the embodiments of the present application, the receiving unit is specifically configured to: receive the first uplink data packet using the first logical channel; and the sending unit is specifically configured to: use the second logical channel to forward the first uplink data packet to the upper-level relay node.

Optionally, in the embodiments of the present application, the configuration information is determined by the network anchor node.

Optionally, in the embodiments of the present application, the receiving unit is specifically configured to: receive the first uplink data packet using the first logical channel; and the sending unit is specifically configured to use the second logical channel to forward the first uplink data packet to the upper-level relay node according to the instructions of the relay layer.

Optionally, in the embodiments of the present application, the upper-level relay node includes a first relay node and a second relay node, and the receiving unit is specifically configured to: receive a first uplink data packet and a second uplink data packet, the source address of the first uplink data packet being the same as the address of the source node of the second uplink data packet; the sending unit is specifically configured to: forward the first uplink data packet to the first relay node, and forward the second uplink data packet to the first relay node.

Optionally, in the embodiments of the present application, the receiving unit is specifically configured to: receive a first uplink data packet and a second uplink data packet, the source address of the first uplink data packet and the source address of the second uplink data packet being the same; the communication node further includes: a detection unit, configured to detect whether the first uplink data packet and the second uplink data packet are repetitive data packets according to the packet data aggregation protocol (PDCP) layer sequence number of the data packet.

Optionally, in the embodiments of the present application, the sending unit is specifically configured to: if the first uplink data packet and the second uplink data packet are repeated data packets, send the first uplink data packet or the second uplink data packet to the upper-level relay node; or if the first uplink data packet and the second uplink data packet are non-repetitive data packets, send the first uplink data packet and the second uplink data packet to the upper-level relay node.

Optionally, in the embodiments of the present application, the header of the uplink data packet includes first information, and the first information is used to indicate the source address and/or the destination address of the uplink data packet.

Optionally, in the embodiments of the present application, the header of the uplink data packet is outside the header of the packet data aggregation protocol (PDCP) protocol data unit (PDU).

It should be understood that the communication node 2000 according to the embodiment of the present application may correspond to the current relay node in the method embodiment of the present application, and the above and other operations and/or functions of each unit in the communication node 2000 are to implement the corresponding process of the current relay node in the method of FIG. 3. For the sake of brevity, details are not repeated here.

Figure 13:
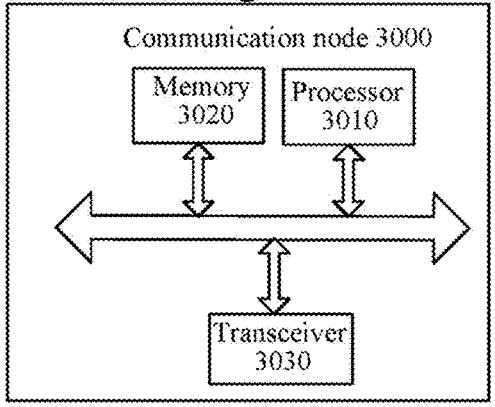
FIG. 13 shows yet another schematic block diagram of the communication node of the embodiment of the present application.

As shown in FIG. 13, an embodiment of the present application further provides a communication node 3000, which may be the communication node 1000 in FIG. 11, and can be used to execute the content of the communication node corresponding to the method 800 in FIG. 8. The communication node 3000 shown in FIG. 13 includes a processor 3010. The processor 3010 can call and run a computer program from the memory to implement the method in the embodiments of the present application.

Optionally, as shown in FIG. 13, the communication node 3000 may further include a memory 3020. The processor 3010 can call and run a computer program from the memory 3020 to implement the method in the embodiments of the present application.

The memory 3020 may be a separate device independent of the processor 3010, or may be integrated in the processor 3010.

Optionally, as shown in FIG. 13, the communication node 3000 may further include a transceiver 3030, and the processor 3010 may control the transceiver 3030 to communicate with other devices. Specifically, the transceiver may send information or data to other devices, or receive information or data sent by other devices.

The transceiver 3030 may include a transmitter and a receiver. The transceiver 3030 may further include an antenna, and the number of antenna may be one or more.

Optionally, the communication node 3000 may be the network anchor node of the embodiment of this application, and the communication node 3000 may implement the corresponding process implemented by the network anchor node in each method of the embodiment of this application. For the sake of brevity, details are not repeated here.

In a specific embodiment, the receiving unit in the communication node 1000 may be implemented by the transceiver 3030 in FIG. 13. The determining unit and the processing unit in the communication node 1000 may be implemented by the processor 3010 in FIG. 13.

Figure 14:
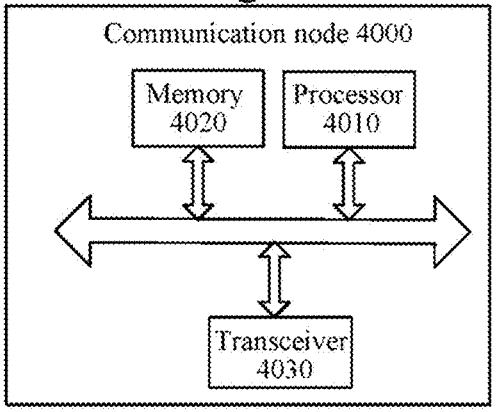
FIG. 14 shows yet another schematic block diagram of the communication node of the embodiment of the present application.

As shown in FIG. 14, an embodiment of the present application further provides a communication node 4000, which may be the communication node 1000 in FIG. 12, and can be used to execute the content of the communication node corresponding to the method 900 in FIG. 9. The communication node 4000 shown in FIG. 14 includes a processor 4010. The processor 4010 can call and run a computer program from the memory to implement the method in the embodiment of the present application.

Optionally, as shown in FIG. 14, the communication node 4000 may further include a memory 4020. The processor 4010 can call and run a computer program from the memory 4020 to implement the method in the embodiments of the present application.

The memory 4020 may be a separate device independent of the processor 4010, or may be integrated in the processor 4010.

Optionally, as shown in FIG. 14, the communication node 4000 may further include a transceiver 4030, and the processor 4010 may control the transceiver 4030 to communicate with other devices. Specifically, the transceiver 4030 may send information or data to other devices, or receive information or data sent by other devices.

The transceiver 4030 may include a transmitter and a receiver. The transceiver 4030 may further include an antenna, and the number of antenna may be one or more.

Optionally, the communication node 4000 may be a network anchor node according to an embodiment of the present application, and the communication node 4000 may implement the corresponding process implemented by the network anchor node in each method of the embodiment of the present application.

In a specific embodiment, the receiving unit and the sending unit in the communication node 2000 may be implemented by the transceiver 4030 in FIG. 14. The detection unit in the communication node 2000 may be implemented by the processor 4010 in FIG. 14.

Figure 15:
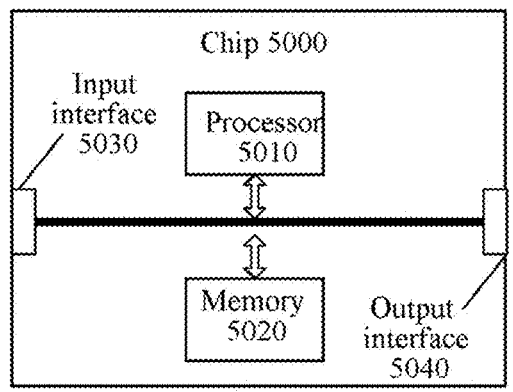
FIG. 15 shows a schematic block diagram of a chip according to an embodiment of the present application.

FIG. 15 is a schematic block diagram of a chip 5000 according to an embodiment of the present application. The chip 5000 shown in FIG. 15 includes a processor 5010, and the processor 5010 can call and run a computer program from the memory to implement the method 100 in the embodiments of the present application.

Optionally, as shown in FIG. 15, the chip 5000 may further include a memory 5020. The processor 5010 can call and run a computer program from the memory 5020 to implement the method in the embodiments of the present application.

The memory 5020 may be a separate device independent of the processor 5010, or may be integrated in the processor 5010.

Optionally, the chip 5000 may further include an input interface 5030. The processor 5010 can control the input interface 5030 to communicate with other devices or chips. Specifically, the input interface 5030 can obtain information or data sent by other devices or chips.

Optionally, the chip 5000 may further include an output interface 5040. The processor 5010 can control the output interface 5040 to communicate with other devices or chips. Specifically, the output interface 5040 can output information or data to other devices or chips.

Optionally, the chip can be applied to the current relay node in the embodiments of the present application, and the chip can implement the corresponding process implemented by the current relay node in the method 200 of the embodiments of the present application.

It should be understood that the chip mentioned in the embodiments of the present application may also be referred to as a system level chip, a system chip, a chip system, or a system-on-chip chip.

Figure 16:
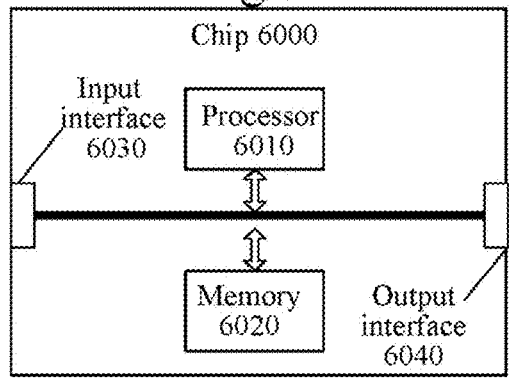
FIG. 16 shows another schematic block diagram of the chip according to the embodiment of the present application.

FIG. 16 is a schematic block diagram of a chip 6000 according to an embodiment of the present application. The chip 6000 shown in FIG. 16 includes a processor 6010, and the processor 6010 can call and run a computer program from the memory to implement the method 100 in the embodiments of the present application.

Optionally, as shown in FIG. 16, the chip 6000 may further include a memory 6020. The processor 6010 can call and run a computer program from the memory 6020 to implement the method in the embodiments of the present application.

The memory 6020 may be a separate device independent of the processor 6010, or may be integrated in the processor 6010.

Optionally, the chip 6000 may further include an input interface 6030. The processor 6010 can control the input interface 6030 to communicate with other devices or chips. Specifically, the input interface 6030 can obtain information or data sent by other devices or chips.

Optionally, the chip 6000 may further include an output interface 6040. The processor 6010 can control the output interface 6040 to communicate with other devices or chips. Specifically, the output interface 6040 can output information or data to other devices or chips.

Optionally, the chip can be applied to the central node in the embodiment of the present application, and the chip can implement the corresponding process implemented by the central node in the method 300 of the embodiments of the present application.

It should be understood that the chip mentioned in the embodiments of the present application may also be referred to as a system level chip, a system chip, a chip system, or a system-on-chip chip.

Figure 17:
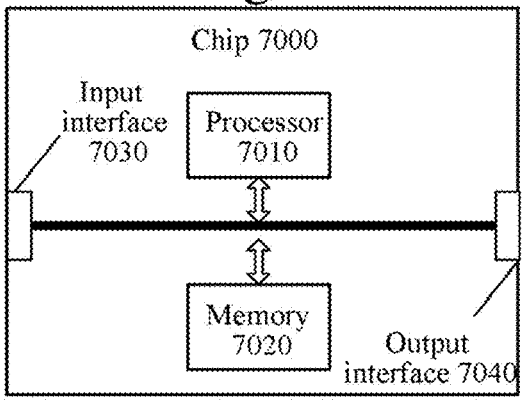
FIG. 17 shows yet another schematic block diagram of the chip of the embodiment of the present application.

FIG. 17 is a schematic block diagram of a chip 7000 according to an embodiment of the present application. The chip 7000 shown in FIG. 17 includes a processor 7010, and the processor 7010 can call and run a computer program from the memory to implement the method 100 in the embodiments of the present application.

Optionally, as shown in FIG. 17, the chip 7000 may further include a memory 7020. The processor 7010 can call and run a computer program from the memory 7020 to implement the method in the embodiments of the present application.

The memory 7020 may be a separate device independent of the processor 7010, or may be integrated in the processor 7010.

Optionally, the chip 7000 may further include an input interface 7030. The processor 7010 can control the input interface 7030 to communicate with other devices or chips. Specifically, the input interface 7030 can obtain information or data sent by other devices or chips.

Optionally, the chip 7000 may further include an output interface 7040. The processor 7010 can control the output interface 7040 to communicate with other devices or chips. Specifically, the output interface 7040 can output information or data to other devices or chips.

Optionally, the chip can be applied to the network anchor node in the embodiments of the present application, and the chip can implement the corresponding process implemented by the network anchor node in the method 800 of the embodiments of the present application.

It should be understood that the chip mentioned in the embodiments of the present application may also be referred to as a system level chip, a system chip, a chip system, or a system-on-chip chip.

Figure 18:
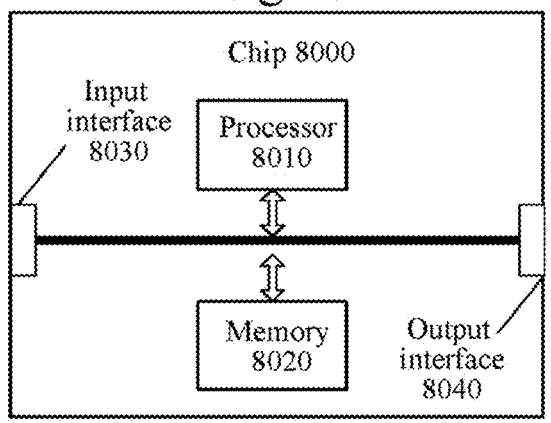
FIG. 18 shows yet another schematic block diagram of the chip of the embodiment of the present application.

FIG. 18 is a schematic block diagram of a chip 8000 according to an embodiment of the present application. The chip 8000 shown in FIG. 18 includes a processor 8010, and the processor 8010 can call and run a computer program from the memory to implement the method 100 in the embodiments of the present application.

Optionally, as shown in FIG. 18, the chip 8000 may further include a memory 8018. The processor 8010 can call and run a computer program from the memory 8018 to implement the method in the embodiments of the present application.

The memory 8018 may be a separate device independent of the processor 8010, or may be integrated in the processor 8010.

Optionally, the chip 8000 may further include an input interface 8030. The processor 8010 can control the input interface 8030 to communicate with other devices or chips. Specifically, the input interface 8030 can obtain information or data sent by other devices or chips.

Optionally, the chip 8000 may further include an output interface 8040. The processor 8010 can control the output interface 8040 to communicate with other devices or chips. Specifically, the output interface 8040 can output information or data to other devices or chips.

Optionally, the chip can be applied to the current relay node in the embodiments of the present application, and the chip can implement the corresponding process implemented by the current relay node in the method 900 of the embodiments of the present application. Repeat.

It should be understood that the chip mentioned in the embodiments of the present application may also be referred to as a system level chip, a system chip, a chip system, or a system-on-chip chip.

The processor mentioned above may be a general-purpose processor, a digital signal processor (DSP), a field programmable gate array (FPGA), an application specific integrated circuit (ASIC), or other programmable logic devices, transistor logic devices, discrete hardware components, etc. Among them, the aforementioned general-purpose processor may be a microprocessor or any conventional processor.

The above-mentioned memory may be a volatile memory or a non-volatile memory, or may include both the volatile and non-volatile memory. Among them, the non-volatile memory can be a read-only memory (ROM), a programmable ROM (PROM), an erasable PROM (EPROM), an electronically EPROM (EEPROM) or a flash memory. The volatile memory may be a random access memory (RAM).

It should be understood that the foregoing memory is exemplary but not limiting, for example, the memory in the embodiments of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous connection dynamic random access memory (synch link DRAM, SLDRAM) and a direct memory bus random access memory (Direct Rambus RAM, DR RAM), etc. That is to say, the memories in the embodiments of the present application are intended to include but are not limited to these and any other suitable types of memories.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the specific application and design constraints of the technical solution. Professional technicians can use different methods to implement the described functions for each specific application, but such implementation should not be considered to go beyond the scope of this application.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods may be implemented in other ways. For example, the device embodiments described above are only schematic. For example, the division of the unit is only a logical function division. In actual implementation, there may be other division manner. For example, a plurality of units or components may be combined or may be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, may be located in one place, or may be distributed on a plurality of network units. Some or all of the units may be selected according to actual needs to achieve the objective of the solution of this embodiment.

In addition, each functional unit in each embodiment of the present application may be integrated into one monitoring unit, or each unit may exist separately and physically, or two or more units may be integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to perform all or a part of the steps of the embodiments of this application. The foregoing storage medium includes: any medium that can store program codes, such as a USB flash disk, a removable hard disk, a read-only memory (Read-Only Memory, ROM), a random access memory (Random Access Memory, RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A relay routing method, comprising:
   receiving, by a current relay node, at least one data packet, wherein a header of each of the at least one data packet comprises an address of a destination node of the data packet, the at least one data packet comprises a first data packet and a second data packet, and the address of the destination node of the first data packet is the same as the address of the destination node of the second data packet;
   determining, by the current relay node, whether to forward the first data packet and/or the second data packet;
   wherein the routing method further comprises: before receiving, by the current relay node, the at least one data packet,
       receiving, by the current relay node, a routing table sent by a central node, wherein the routing table is used to indicate a transmission path of each of the at least one data packet from a source node to the destination node; and
   when determining, by the current relay node, to forward the first data packet and/or the second data packet,
       forwarding, by the current relay node, the first data packet and/or the second data packet to the at least one relay node according to the routing table;
   wherein forwarding, by the current relay node, the first data packet and/or the second data packet to the at least one relay node according to the routing table comprises:
   detecting, by the current relay node, whether the first data packet and the second data packet are repetitive data packets according to a packet data aggregation protocol (PDCP) layer sequence number of the first data packet and a PDCP layer sequence number of the second data packet; and
   when the first data packet and the second data packet are repetitive data packets, sending, by the current relay node, one of the first data packet and the second data packet to the at least one relay node.

2. The routing method according to claim 1, wherein forwarding, by the current relay node, the first data packet and/or the second data packet to the at least one relay node comprises:
   forwarding, by the current relay node, the first data packet and/or the second data packet to the at least one relay node according to a channel quality.

3. The routing method according to claim 1, wherein the routing method further comprises:
   copying, by the current relay node, the first data packet.

4. The routing method according to claim 3, wherein forwarding, by the current relay node, the first data packet and/or the second data packet to at least one relay node comprises:
   forwarding, by the current relay node, the first data packet to the first relay node of the at least one relay node, and forwarding the copied first data packet to the second relay node of the at least one relay node, or,
   wherein forwarding, by the current relay node, the first data packet and/or the second data packet to at least one relay node comprises:
       forwarding, by the current relay node, the first data packet to the first relay node of the at least one relay node using a first logical channel, and forwarding the copied first data packet to the first relay node using a second logical channel.

5. The routing method according to claim 1, wherein the header of each of the at least one data packet further comprises an address of a source node of the data packet.

6. The routing method according to claim 1, further comprising:
   when the current relay node fails, reporting, by the current relay node, failure information to the central node, so that the central node updates the routing table.

7. The routing method according to claim 1, wherein the at least one data packet comprises a downlink data packet.

8. The routing method according to claim 1, wherein the at least one data packet comprises an uplink data packet and a downlink data packet.

9. The routing method according to claim 1, wherein one or more of the following:
   when the at least one data packet is an uplink data packet, the at least one relay node is a parent node of the current relay node;
   wherein the address of the destination node is an address of a terminal device to which the at least one data packet belongs;
   wherein the address of the destination node is an address of a relay node directly connected to a terminal device to which the at least one data packet belongs;
   wherein the address of the destination node comprises an address of a terminal device to which the at least one data packet belongs and an address of a relay node directly connected to a terminal device to which the at least one data packet belongs;
   wherein the address of the terminal device to which the at least one data packet belongs is allocated by a central node;
   wherein the address of the relay node directly connected to the terminal device to which the at least one data packet belongs is allocated by a central node;
   wherein the central node is an anchor node, a fixedly accessed access network node or a core network node;

wherein the header of each of the at least one data packet is in a header of a packet data aggregation protocol (PDCP) protocol data unit (PDU);
wherein the header of each of the at least one data packet is outside a header of a packet data aggregation protocol (PDCP) protocol data unit (PDU);
wherein the at least one data packet is a downlink data packet; and
wherein the at least one data packet comprises a downlink data packet forwarded between relay nodes.

10. The routing method according to claim 1, wherein the receiving, by the current relay node, the first data packet comprises:
   receiving, by the current relay node, the first data packet using a first logical channel; and
wherein forwarding, by the current relay node, the first data packet to the at least one relay node comprises:
   forwarding, by the current relay node, the first data packet to the at least one relay node using a second logical channel according to configuration information.

11. The routing method according to claim 10, wherein the configuration information is determined by the central node.

12. A communication node, wherein the communication node is a current relay node, and the communication node comprises:
   a memory for storing instructions; and
   a processor, configured to execute the instructions stored in the memory, to perform:
      receiving at least one data packet, wherein a header of each of the at least one data packet comprises an address of a destination node of the data packet, the at least one data packet comprises a first data packet and a second data packet, and the address of the destination node of the first data packet is the same as the address of the destination node of the second data packet;
      determining whether to forward the first data packet and/or the second data packet;
   wherein the processor is configured to: before receiving the data packet,
      receive a routing table sent by a central node, wherein the routing table is used to indicate a transmission path of each of the at least one data packet from a source node to the destination node; and
   when determining to forward the first data packet and/or the second data packet, the processor is further configured to:
      forward the first data packet and/or the second data packet to the at least one relay node according to the routing table,
   wherein the processor is further configured to:
   detect whether the first data packet and the second data packet are repetitive data packets according to a packet data aggregation protocol (PDCP) layer sequence number of the first data packet and a PDCP layer sequence number of the second data packet and
   when the first data packet and the second data packet are repetitive data packets, send one of the first data packet and the second data packet to the at least one relay node.

13. A circuit, comprising:
   a processor for calling and running a computer program from a memory, so that a device installed with the processor executes the following steps:
      receiving at least one data packet, wherein a header of each of the at least one data packet comprises an address of a destination node of the data packet, the at least one data packet comprises a first data packet and a second data packet, and the address of the destination node of the first data packet is the same as the address of the destination node of the second data packet;
      determining whether to forward the first data packet and/or the second data packet;
   wherein the device installed with the processor is configured to: before receiving the data packet,
      receive a routing table sent by a central node, wherein the routing table is used to indicate a transmission path of each of the at least one data packet from a source node to the destination node; and
   when determining to forward the first data packet and/or the second data packet, the device installed with the processor is configured to:
      forward the first data packet and/or the second data packet to the at least one relay node according to the routing table,
   wherein the device installed with the processor is further configured to:
   detect whether the first data packet and the second data packet are repetitive data packets according to a packet data aggregation protocol (PDCP) layer sequence number of the first data packet and a PDCP layer sequence number of the second data packet and
   when the first data packet and the second data packet are repetitive data packets, send one of the first data packet and the second data packet to the at least one relay node.

* * * * *